(No Model.)
J. KELLY.
VALVE DEVICE.
No. 433,628. Patented Aug. 5, 1890.
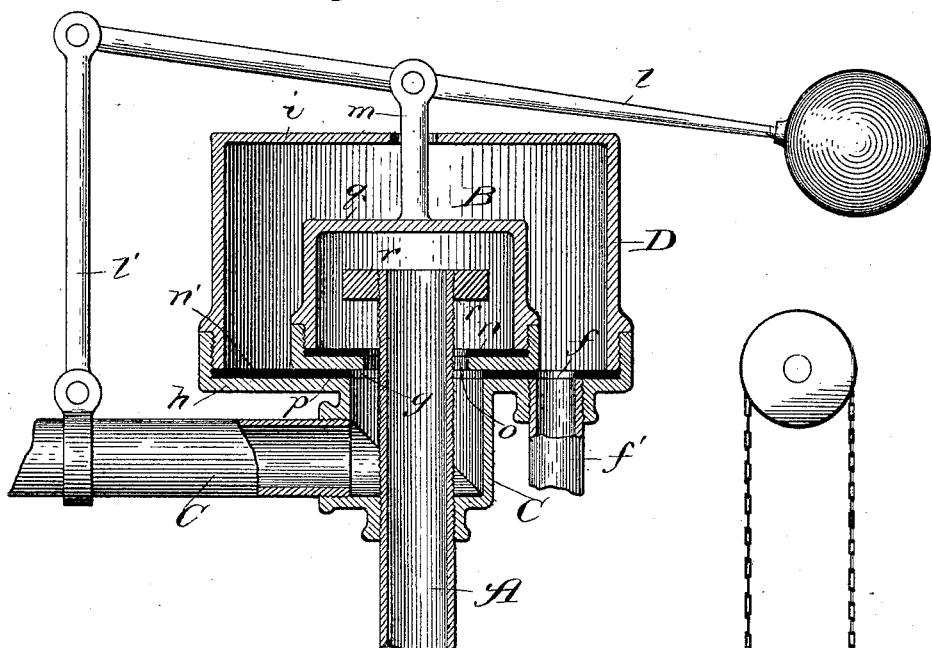
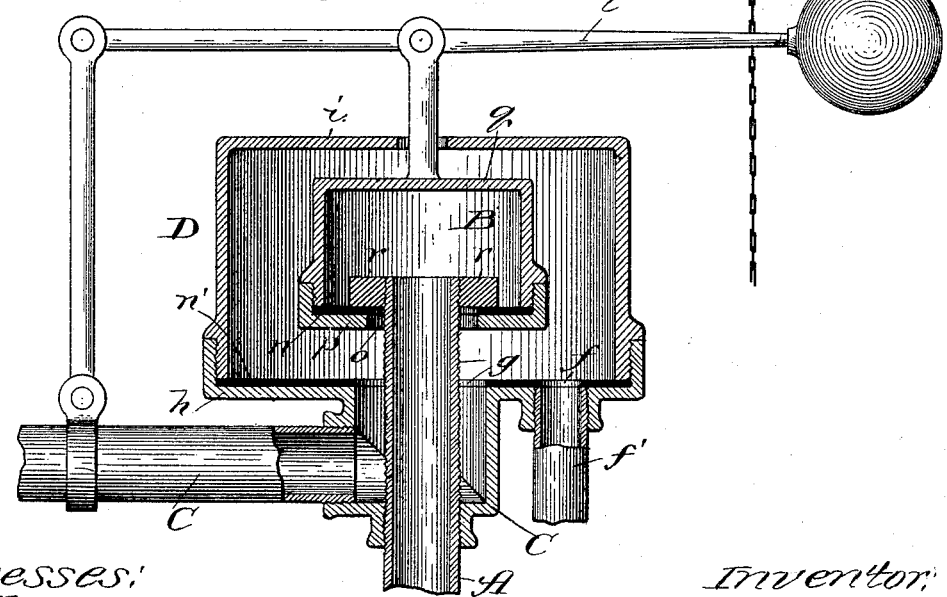
Witnesses:
Inventor:
John Kelly,
By Dyrenforth & Dyrenforth,
Attys.

UNITED STATES PATENT OFFICE.

JOHN KELLY, OF CHICAGO, ILLINOIS.

VALVE DEVICE.

SPECIFICATION forming part of Letters Patent No. 433,628, dated August 5, 1890.

Application filed February 11, 1890. Serial No. 339,992. (No model.)

*To all whom it may concern:*

Be it known that I, JOHN KELLY, a citizen of the United States, residing at Chicago, in the county of Cook and State of Illinois, have invented a new and useful Improvement in Valve Devices, of which the following is a specification.

The object of my invention is to provide a simple construction of valve which shall tend to close by the pressure of water and the construction of which shall render it suitable and operative for various purposes, as for a stop and waste valve, a feed-valve for a water-closet tank, or a discharge-valve for such a tank.

In the accompanying drawings, Figure 1 is a view of my improved device in broken sectional elevation, showing the valve open, and Fig. 2 a similar view of the same, showing the valve closed.

A denotes the water-inlet or supply pipe, surrounded near its mouth by a flange $r$, forming the valve-seat; and B is the valve-chamber, comprising a hollow and preferably circular body closed at one end, forming its top $q$, and having an opening $o$, preferably circular, in its base $p$, smaller in diameter than the flange forming the valve-seat $r$. For convenience in construction the chamber B may be formed in two parts adjusted together by screwing, as shown. Around the opening $o$ the base $p$ should be provided on its inner side with packing $n$. An outlet-pipe C leads from the opening $o$, around the inlet-pipe A. The pressure of inlet-water through the pipe A will force the chamber or shell B in the direction of the pressure and bind the packed base $p$ against the under side of the flange or seat $r$, thereby closing the device, while to permit the passage of water through it from the supply-pipe A to the outlet-pipe C it is only necessary to depress the chamber B, thereby to separate its base from the seat $r$. As a means for permitting the chamber B to be so separated from the seat $r$, the chamber may be provided with a stem $m$, at which to apply any suitable form of lever device, operated through a chain or otherwise, for normally or at will holding the chamber B away from its seat. I have shown for the purpose a lever $l$, weighted at one end and connected at its opposite end through a link $l'$ with the pipe C, as a suitable fulcrum and pivoted between its extremities to the stem $m$. The weighted lever $l$ normally holds the chamber B down from the seat $r$, or maintains the valve open against the pressure of water entering it from the pipe A, and to close the valve the weight on the end of the lever may be removed, or, more properly, the weighted lever is lifted and fastened by any suitable means in its raised position to counteract the gravity of the weight, as by employing the latter, in a usual manner, as a float in the use of the valve device in a water-closet overhead supply-tank, to control automatically the supply of water to the tank, or, if the device be used for a stop and waste cock, by means of a chain passing over a suitably-located pulley, as represented in Fig. 2. The chamber B is enveloped by a shell D, through the cover $i$ of which the stem $m$ extends, and having on its base $h$ an outlet-opening $g$, concentric with the opening $o$ in the chamber B, and from which the water-outlet C leads, the base $h$ being provided with packing $n'$ around the opening $g$ and around a waste-opening formed at one side in the base $h$ of the outer shell, and from which leads the waste-pipe $f'$.

Like the chamber B, the shell D may for convenience in construction be formed in two adjustable parts, as shown.

The device as a stop and waste valve operates as follows: The weight on the lever $l$ is permitted normally to act upon it to maintain the chamber B away from its seat $r$ against the tendency of the pressure of water from the pipe C to force it against its seat, and thereby the parts are caused to occupy their relative positions, (illustrated in Fig. 1,) wherein they permit the supply of water to gain access to the pipe C and thence enter the pipe system of supply in a house. To shut off the supply for the usual purpose of stop and waste valves, the weighted lever $l$ is raised, (as through the medium, commonly employed to that end, of a chain, which may be secured by a hook or the like,) thus bringing the packed base of the chamber B against the flange $r$, whereby the pressure in the pipe A tends to hold and bind it. Thus the passage from the pipe C to the waste-opening $f$, through the shell D, is opened, permitting the water in the supply-pipe system of the house to return and escape in the usual manner through the waste-pipe $f'$.

What I claim as new, and desire to secure by Letters Patent, is—

A stop and waste valve comprising, in combination, a supply-pipe A, having a flange $r$ near its mouth and forming a valve-seat, a chamber B, movable perpendicularly with relation to the said valve and enveloping the flanged end of the supply-pipe, and provided with an opening $o$ in its base through which the pipe A enters, and narrower than the flange $r$, to be closed by the latter under the pressure entering through the pipe A against the closed end of the chamber B, packing $n$ on the base of the chamber B, around the opening $o$ therein, a shell D, enveloping the chamber B and provided with a waste-opening $f$ in its base and with an opening $g$ therein, packing $n'$ on the base of the shell D, an outlet-pipe C, leading from the opening $g$, a stem $m$, extending from the chamber B through the shell D, and a weighted lever $l$, connected with the said stem, substantially as described.

JOHN KELLY.

In presence of—
   J. W. DYRENFORTH,
   M. J. FROST.